United States Patent
Allard-Jacquin et al.

(10) Patent No.: US 8,279,880 B2
(45) Date of Patent: Oct. 2, 2012

(54) COMMUNICATION GATEWAY BETWEEN WIRELESS COMMUNICATION NETWORKS

(75) Inventors: Patrick Allard-Jacquin, La Buisse (FR); Olivier Coutelou, Grenoble (FR); Gilles Thonet, Meylan (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 781 days.

(21) Appl. No.: 11/747,579

(22) Filed: May 11, 2007

(65) Prior Publication Data

US 2007/0268920 A1    Nov. 22, 2007

Related U.S. Application Data

(60) Provisional application No. 60/889,656, filed on Feb. 13, 2007.

(30) Foreign Application Priority Data

May 19, 2006   (FR) ...................................... 06 51855

(51) Int. Cl.
    *G08B 1/08*     (2006.01)
    *H04L 12/28*    (2006.01)
    *H04L 12/56*    (2006.01)
    *H04J 3/16*     (2006.01)
    *H04J 3/22*     (2006.01)
    *H04B 1/38*     (2006.01)

(52) U.S. Cl. ................... 370/401; 340/539.12; 370/254; 370/466; 455/73

(58) Field of Classification Search ............. 340/539.12; 370/254, 401; 455/73
See application file for complete search history.

(56) References Cited

U.S. PATENT DOCUMENTS 6,490,929 B1 *  12/2002  Russell et al. .................. 73/660
7,099,285 B1 *   8/2006  Kanuri et al. ................. 370/254
(Continued)

OTHER PUBLICATIONS

Jianliang Zheng, et al., "Will IEEE 802.15.4 Make Ubiquitous Networking a Reality?: A Discussion on a Potential Low Power, Low Bit Rate Standard", IEEE Communications Magazine, vol. 42, No. 6, Topics in Emerging Technologies, XP-001198209, ISSN: 0163-6804, Jun. 2004, pp. 140-146.

*Primary Examiner* — Hassan Phillips
*Assistant Examiner* — Lonnie Sweet
(74) *Attorney, Agent, or Firm* — Oblon, Spivak, McClelland, Maier & Neustadt, L.L.P.

(57) ABSTRACT

A communication gateway includes a communication unit that transmits and receives messages in order to communicate with at least one remote communication node on a first wireless communication network according to a protocol which includes network access control (MAC), and receives messages originating from at least one transmitter transmitting messages on a second wireless communication network according to a protocol which does not include network access control (MAC). The protocols of the first and second wireless communication networks use a same physical layer (PHY). The communication gateway also includes a processing unit associated with the communication unit that differentiates between the received messages originating from the first wireless communication network and the received messages originating from the second wireless communication network by analyzing header information contained in the received messages originating from the first wireless communication network and in the received messages originating from the second wireless communication network.

14 Claims, 1 Drawing Sheet

U.S. PATENT DOCUMENTS

Figure 1:
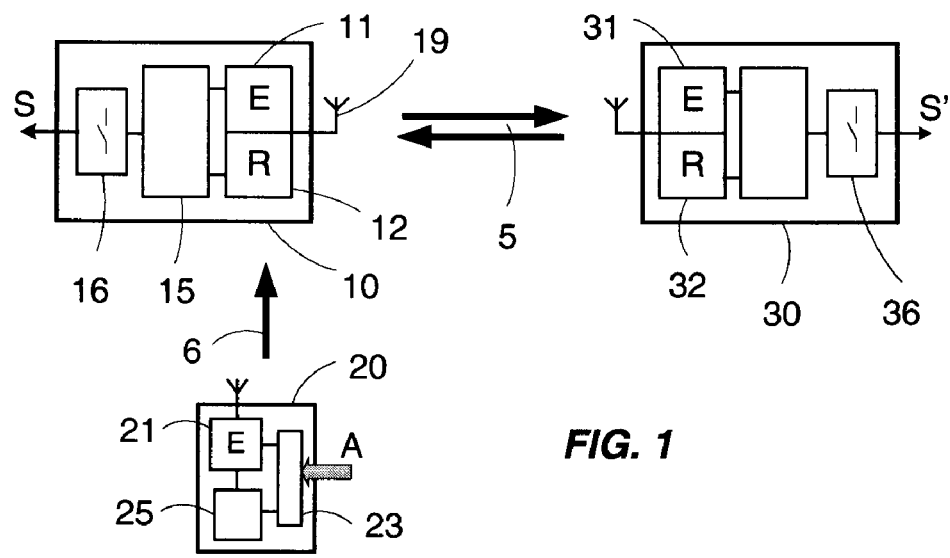

| | | |
|---|---|---|
| 2003/0151513 A1 | 8/2003 | Herrmann et al. |
| 2004/0122930 A1 | 6/2004 | Pasternak |
| 2005/0136972 A1* | 6/2005 | Smith et al. ............... 455/554.1 |
| 2005/0171662 A1 | 8/2005 | Strege et al. |
| 2005/0206518 A1* | 9/2005 | Welch et al. ............. 340/539.12 |
| 2006/0238932 A1* | 10/2006 | Westbrock et al. ............. 361/42 |
| 2006/0286977 A1* | 12/2006 | Khandelwal et al. ...... 455/432.1 |
| 2007/0030832 A1* | 2/2007 | Gonia et al. .................. 370/338 |
| 2007/0097993 A1* | 5/2007 | Bojahra et al. ................ 370/401 |
| 2008/0125057 A1* | 5/2008 | Nass et al. ...................... 455/73 |

* cited by examiner

COMMUNICATION GATEWAY BETWEEN WIRELESS COMMUNICATION NETWORKS

The present invention relates to a communication system which is capable of exchanging messages by means of wireless communication networks, in particular sensor/actuator networks. A communication system of this type may, for example, be found in sectors of activity such as building automation (lighting control, thermal control, etc.), industrial process automation and automatic meter reading (AMR).

In the document below, the term "advanced communication network" will be used to refer to any network whose communication protocol includes the capacity to carry out network access control (Medium Access Control MAC layer). Network access control also includes control of the traffic between the different devices (or communication nodes) connected to the network. For example, in an advanced communication network, the protocol may provide a monitoring mechanism prior to the authorisation to transmit, a message retransmission mechanism with "timeout" and "acknowledge". Due to the functionalities offered by advanced communication networks (in particular CSMA, automatic retransmission, acknowledge, meshing, etc.), the communication nodes must have the capacity to act as both transmitters and receivers. ZigBee technology is an example of a radio communication network of this type. It is described in the document entitled "ZigBee Specification V1.0" published by the "ZigBee Alliance". For the lowest communication layers, this technology currently complies with the IEEE 802.15.4 standard and potentially with the IEEE 802.15.4b or IEEE 802.15.4a standards.

Communication nodes which communicate on a wireless communication network are powered either in a conventional manner from an external power supply (mains), or only from a mini power source such as an internal battery or a temporary transformation device which transforms mechanical energy into electrical energy. In the latter case, the communication node is normally asleep or on standby in order to achieve very low consumption. In order to send information on the network, it can either be woken up periodically or it can be woken up by an interruption (for example following an external mechanical action, in the event of a remote control, a wireless lighting switch or a wireless limit detector).

In order to exchange messages directly on an advanced communication network, the node which has just woken up will generally monitor the channel before seizing it, sending its message on the communication network, waiting for information feedback and possibly retransmitting the message if the first message has been ignored.

If this type of advanced protocol is to be implemented, the communication node must then have reception means and must be able to remain in an active phase for a period which may last several hundreds of milliseconds. These transmission/reception phases of the node consume considerable amounts of power, which is either drawn from the internal battery on each request with the risk of discharging it prematurely, or is incompatible with the power supplied by the temporary power transformation device.

This is why communication nodes already exist, referred to below as simple transmitters and generally powered by a mini power source, which do not have means to receive messages, but which are only capable of transmitting short blind message by radio. Simple transmitters of this type cannot therefore be directly integrated into an advanced communication network, but can only communicate via a communication network whose simplified communication protocol does not comprise a network access control functionality (MAC layer). However, a simplified communication protocol of this type quickly renders the network uncontrollable if it includes, for example, a plurality of simple transmitters communicating with a plurality of receivers via a plurality of message repeaters (echoes, congestion, loops, etc.). A simple transmitter may, for example, be a wireless and batteryless button, such as a push-button, a switch, a limit detector or the like, whose only power source originates from the activation of this button, by transforming the mechanical actuation energy into electrical energy during a brief period.

The document US 2005/171662 A1 describes a distributed automation system in a vehicle communicating via a wireless communication network by means of "transceivers" connected in a star configuration or in a meshed network. However, this system still describes a homogeneous network in which all of the transceivers use either only the physical layer PHY of the IEEE802.15.4 protocol, or the physical layer PHY and the MAC layer of the IEEE802.15.4 protocol, or a ZigBee network in accordance with the IEEE802.15.4 standard. The document does not contain any indication of a communication gateway which would be capable of receiving messages originating either from a network using only the physical layer PHY according to IEEE802.15.4 or from a different network using the physical layer PHY and the MAC layer according to IEEE802.15.4.

In order to transmit messages to nodes connected to an advanced communication network, a simple transmitter must therefore pass via a communication gateway which, on the one hand, is capable of continuously monitoring a message originating from the simple transmitter and, on the other hand, is capable of routing this message to a different recipient across the advanced communication network.

Nevertheless, the communication gateway must then comprise first reception means to communicate with the simple transmitter via a first simple communication network and second reception means to communicate with other nodes via a second advanced communication network. The disadvantage of this architecture is that two communication technologies need to be implemented in the gateway: a first technology for the radio transceiver communicating on the advanced communication network, and a second different technology for the radio receiver whose function is to pick up the message(s) originating from the simple transmitter associated with it. This double technology in a gateway incurs substantial additional costs.

For this reason, the object of the invention is to significantly reduce the cost of a communication gateway which is capable of both sending and receiving messages with remote nodes on a first advanced wireless communication network, and of receiving messages from a transmitter on a second wireless communication network.

To do this, the invention describes a communication gateway comprising means for transmission and means for reception of messages in order to communicate with at least one remote communication node on a first wireless communication network according to a protocol which includes network access control. Said reception means are also capable of receiving messages originating from at least one simple transmitter transmitting messages on a second wireless communication network according to a protocol which does not include network access control. The gateway comprises a processing unit associated with said reception means and capable of differentiating between the received messages originating from the first communication network and the received messages originating from the second communication network by analysing header information contained in the received messages.

According to one characteristic, the protocol of the first communication network and the physical layer of the protocol of the second communication network comply with the IEEE 802.15.4 standard or the IEEE 802.15.4a standard or the IEEE 802.15.4b standard.

According to a different characteristic, the gateway comprises an actuator which is controlled by the processing unit following the reception of a control command contained in a message originating from the first or second communication network.

The invention also describes a communication system comprising a gateway containing means for transmission and means for reception of messages via a first wireless communication network according to a protocol network which includes network access control, at least one remote communication node capable of communicating with the gateway on the first wireless communication network, and at least one simple transmitter capable of transmitting messages on a second wireless communication network according to a protocol which does not include network access control. Said reception means of the gateway are also capable of receiving messages originating from said simple transmitter, and the gateway comprises a processing unit associated with said reception rooms and capable of differentiating between the received messages originating from the first communication network and the received messages originating from the second communication network by analysing header information contained in the received messages.

Figure 2:
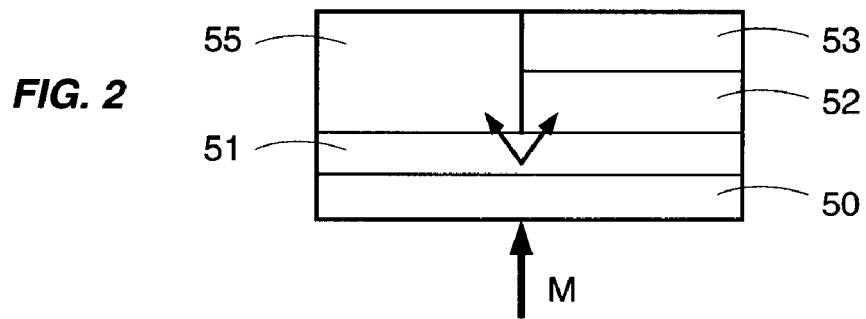

Other characteristics and advantages will be explained in the detailed description which follows, with reference to an embodiment provided by way of example and shown in the attached drawings, in which:

FIG. 1 shows an example of a simplified architecture of the communication system according to the invention, FIG. 2 is a schematic representation of the different layers of the software stack of the gateway.

With reference to the example shown in FIG. 1, a wireless communication system comprises a simple transmitter 20, a communication gateway 10 and a remote communication device or node 30. The gateway 10 communicates with the remote device 30 via a first wireless communication network 5 according to a first advanced communication protocol which includes a network access control functionality (MAC layer).

Moreover, the gateway 10 communicates with the simple transmitter 20 via a second wireless communication network 6 according to a second, simplified, communication protocol, which does not include a network access control functionality (MAC layer). For the sake of simplification, FIG. 1 contains only a single simple transmitter 20 and a single remote node 30, but it is evident that the invention provides for the gateway 10 to communicate with a plurality of simple transmitters and a plurality of remote nodes.

The simple transmitter 20 may be a push-button, RF switch, RF remote control, limit detector device or the like. It comprises an electronic processing unit 25 (such as a microcontroller or a state machine) connected to transmission means 21 (of the radio transmitter type) capable of transmitting on the second communication network 6 with the aid of an antenna. The simple transmitter 20 is powered by a mini power source 23. This mini power source 23 may be either an internal battery or a converter of mechanical energy into electrical energy which temporarily supplies electrical energy when a mechanical action A is performed on the transmitter 20.

When an action A of this type is performed, the electronics of the transmitter 20 are then powered by the source 23 and the processing unit 25 goes into operation then decides to transmit a short message on the second communication network 6 corresponding to the action A performed. Conversely, the transmitter 20 does not have reception means and cannot therefore monitor the communications in progress or receive messages from a remote device. It is therefore not capable of communicating directly on the first wireless network 5.

Optionally, since the protocol of the second wireless network 6 does not provide network access control management, it may be advantageous to increase the reliability of the radio transmissions from the transmitter 20. To do this, if the electrical power produced by the source 23 is sufficient, it can be envisaged that the transmission means 21 successively transmit the short message corresponding to the action A several times. It can also be envisaged that these successive short messages are transmitted with different or pseudo-random time intervals between the messages.

The gateway 10 comprises an electronic processing unit 15 (such as a microcontroller) connected to reception means 12 and transmission means 11 which enable radio messages to be transmitted and received with the aid of an antenna 19. The remote node 30 also comprises a processing unit connected to reception means 32 and transmission means 31 enabling radio messages to be transmitted and received with the aid of an antenna.

The gateway 10 and the remote node 30 can communicate with one another according to the communication protocol of the first communication network 5. According to one embodiment, the protocol of the first network 5 complies with the IEEE 802.15.4 standard for the lower network layers: physical layer (PHY) and network access control layer (MAC). Alternatively, the invention also provides for other equivalent embodiments in which, for the lower network layers, the protocol of the first network 5 could comply in particular with the IEEE 802.15.4a standard or the IEEE 802.15.4b standard.

Furthermore, the higher layers of the communication protocol of the first network 5 comply, for example, with the ZigBee specifications (network layer (NWK), application layer).

According to the invention, the physical layer of the simplified protocol of the second network 6 is identical to the physical layer of the advanced protocol of the first network 5. As a result, the reception means 12 of the gateway 10 are capable of receiving not only messages originating from a remote device 30 on the first network 5, but also messages originating from a simple transmitter 20 on the second network 6. The gateway 10 therefore advantageously uses the same hardware (transceiver) and the same physical layer to receive messages originating from the two networks.

Thus, the transmission means 11 of the gateway 10, the transmission means 31 of the remote node 30, but also the transmission means 21 of the transmitter 20 transmit a wave compatible with the frequencies and the modulation (physical layer PHY) described in the IEEE 802.15.4, IEEE 802.15.4a or IEEE 802.15.4b standards.

FIG. 2 shows different layers of the software stack run by the processing unit 15 of the gateway 10 when a message is received. When a message M is received by the reception means 12, it arrives at the physical layer PHY 50. At this stage, it is not yet possible to determine if this message M originates from the first communication network 5 or the second communication network 6, since the physical layers PHY of the two networks 5, 6 are identical.

For this reason, in order to differentiate between the messages and identify their origin, the software stack of the gateway 10 comprises an additional layer 51, referred to as the switching layer, placed above the physical layer 50. If the message M is identified as originating from the first network 5, it is switched directly to the MAC network access control layer 52 then to any higher layers 53 of the protocol of the first advanced communication network 5 (i.e. network layer, application layer, etc.). If the message M is identified as originating from the second network 6, it is switched to a specific processing 55 dedicated to messages originating from simple transmitters.

Typically, the switching layer 51 is therefore run between the physical layer 50 and the MAC layer 52. However, particularly in the case of the IEEE802.15.4 standard, it is also possible that certain control operations, such as the analysis of the CRC field, are already implemented by the hardware in the physical layer 50, i.e. prior to the running of the switching layer 51.

The switching layer 51 run by the processing unit 15 is therefore capable of analysing a header contained in a message received by the physical layer 50 in such a way as to detect the presence of information indicating if the message M has been transmitted according to the simplified protocol of the second network 6. To do this, the content of the message M must contain information specific to the simplified protocol used to transmit the message.

Taking the example of the IEEE 802.15.4 standard, a message M complying with this standard presents the following format:
a preamble coded on four bytes,
a start frame coded on one byte,
frame length information coded on one byte,
a variable information message part (MPDU), fixed, for example, at a length of thirteen bytes in the embodiment presented, and
a frame check sequence coded on two bytes.

The information part of the message (MPDU) comprises a three-byte header and a ten-byte information field. The header comprises frame-type identification information which is coded on three bits. This information enables the identification of a maximum of eight different frame types. The IEEE 802.15.4 standard uses only four types of different frame (corresponding to the values 000-001-010-011 of the frame type). A plurality of values therefore remain available which may enable the coding and identification of an additional frame type corresponding to a message transmitted according to the simplified protocol of the second network 6, for example the value 111, which can consequently be used by a simple transmitter 20 to identify a message transmitted according to a simplified communication protocol.

Thus, during the running of the switching layer 51, the processing unit 15 directs a message M to the specific layer 55 if it contains frame-type identification information equal to the value 111, and to the usual layers 52, 53 if the frame-type identification information is equal to one of the other values specified in the IEEE 802.15.4 standard.

Thanks to this simple processing, a gateway 10 can easily detect and switch messages transmitted by one or the other of the networks 5 and 6. Moreover, this processing does not alter the operating mechanism of the first communication network 5. In fact, if a radio message sent by a simple transmitter 20 is received by the reception means 32 of a remote node 30 which does not include the functionalities of the gateway 10, this message will then be ignored when analysed in the software stack of the node 30, as it comprises frame-type identification information which does not comply with the advanced protocol of the network 5.

The specific layer 55 can be used to carry out a specific processing for the messages M transmitted by simple transmitters 20 dedicated to the application concerned. In fact, the ten-byte information field may comprise the address of the transmitter 20 which sent the message M on eight bytes, and also a coding on two bytes of the action A which generated the message M (for example a start (ON), stop (OFF), increment (IND), decrement (DEC) command, etc.). The specific layer 55 can also manage the redundancy between a plurality of consecutive messages transmitted by the same simple transmitter for the same action A.

Moreover, the gateway 10 may also comprise an actuator 16, such as an electromechanical actuator or the like, controlled by the processing unit 15. This actuator 16 controls an output S or electrical receiver (for example a lamp, motor, etc.). The actuator 16 is controlled following the reception of a control command contained in a message M received by the reception means 12 and originating either from a simple transmitter 20 or a remote node 30. The processing unit 15 analyses and decodes the received message M and controls the actuator 16 according to the content of the message M.

Similarly, a remote node 30 may also comprise an actuator 36, such as an electromechanical actuator or the like, which enables it to control an output S'. Thanks to the invention, this output S' can be controlled by a simple remote transmitter 20. The mode of operation is then as follows: following an action A, a simple transmitter 20 transmits a coded control command in a message M transmitted according to the simplified protocol of the second network 6. This message M is received by the gateway 10 as explained above. If, in analysing the address of the sender of the message M during the layer 55, the processing unit 15 of the gateway 10 detects that the transmitter 20 is logically associated with the output S' of a remote node 30 for the application concerned, it performs a routing operation by redirecting this message M to the transmission means 11 in such a way as to send it to the node 30 according to the advanced protocol of the first network 5. The remote node 30 receives and decodes this message then controls its output S' via the actuator 36.

Thus, the communication system presented in the invention enables a simple transmitter 20, powered by a mini power source 23, not only to control an output S within the range of its own antenna, but also to control an output S' located remotely by using a communication gateway 10 to an advanced communication network 5. Thanks to the invention, the cost of this gateway 10 remains moderate, and the gateway can therefore be integrated into a simple device. In particular, on the basis of the actuation of a simple wireless and batteryless switch 20 whose power source 23 originates only from the transformation of mechanical actuation energy into electrical energy, an actuator, such as a lamp S', located remotely, can therefore be controlled.

It is evident that other variants and refinements, and similarly the use of equivalent means, can be envisaged without exceeding the scope of the invention.

The invention claimed is:

1. A communication gateway, comprising:
a communication unit that transmits and receives messages to communicate with at least one remote communication node on a first wireless communication network according to a protocol which includes network access control, and receives messages originating from at least one transmitter transmitting messages on a second wireless communication network according to a protocol which does not include network access control, whereby the protocol of the first wireless communication network and the protocol of the second wireless communication network use a same physical layer; and
a processing unit associated with said communication unit that differentiates between the received messages originating from the first wireless communication network and the received messages originating from the second wireless communication network by analysing three bits of frame-type identification information of header information contained in the received messages originating from the first wireless communication network and in the received messages originating from the second wireless communication network, wherein, when the three bits of the frame-type identification information are one of 100, 101, 110, and 111, the processing unit determines that a received message originated from the second wireless communication network.

2. The communication gateway according to claim 1, wherein the protocol of the first wireless communication network complies with the IEEE 802.15.4 standard, the IEEE 802.15.4a standard, or the IEEE 802.15.4b standard.

3. The communication gateway according to claim 2, wherein the physical layer of the protocol of the second wireless communication network complies with the physical layer of the IEEE 802.15.4 standard, the IEEE 802.15.4a standard, or the IEEE 802.15.4b standard.

4. The communication gateway according to claim 1, further comprising:
an actuator which is controlled by the processing unit following a reception of a control command contained in a message originating from the first wireless communication network or from the second wireless communication network.

5. The communication gateway according to one of claims 1 to 4, wherein the processing unit redirects a received message originating from the second wireless communication network to the first wireless communication network.

6. A communication system, comprising:
a gateway comprising a communication unit that transmits and receives messages via a first wireless communication network according to a protocol which includes network access control;
at least one remote communication node that communicates with the gateway on the first wireless communication network;
at least one transmitter that transmits messages on a second wireless communication network according to a protocol which does not include network access control, wherein
said communication unit of the gateway receives the messages originating from said at least one transmitter on the second wireless communication network, the protocol of the first wireless communication network using a physical layer of the protocol of the second wireless communication network, and
the gateway comprises a processing unit associated with said communication unit that differentiates between the received messages originating from the first wireless communication network and the received messages originating from the second wireless communication network by analysing three bits of frame-type identification information of header information contained in the received messages originating from the first wireless communication network and the received messages originating from the second wireless communication network, wherein, when the three bits of the frame-type identification information are one of 100, 101, 110, and 111, the processing unit determines that a received message originated from the second wireless communication network.

7. The communication system according to claim 6, wherein the protocol of the first wireless communication network complies with the IEEE 802.15.4 standard, the IEEE 802.15.4a standard, or the IEEE 802.15.4b standard.

8. The communication system according to claim 6, wherein the at least one transmitter is electrically powered by a converter of mechanical energy into electrical energy.

9. The communication system according to claim 6, wherein the gateway comprises an actuator that is controlled following a reception of a control command contained in a message originating from the first wireless communication network or from the second wireless communication network.

10. The communication system according to claim 6, wherein the at least one remote communication node comprises an actuator that is controlled by a control command contained in a message transmitted by the at least one transmitter on the second wireless communication network and retransmitted by the gateway to the at least one remote communication node via the first wireless communication network.

11. The communication system according to one of claims 6 and 8 to 10, wherein the processing unit redirects a received message originating from the second wireless communication network to the first wireless communication network.

12. The communication gateway according to claim 1, wherein, when the processing unit determines that the received message originated from the second wireless communication network based on the three bits of the frame-type identification information, the processing unit transmits the received message according to the protocol which includes network access control.

13. The communication system according to claim 6, wherein the physical layer of the protocol of the second wireless communication network complies with the physical layer of the IEEE 802.15.4 standard, the IEEE 802.15.4a standard, or the IEEE 802.15.4b standard.

14. The communication gateway according to claim 1, wherein the header information is included in an MPDU of a message, the MPDU also including an information field.

* * * * *